May 20, 1969     H. V. C. STREET ET AL     3,445,834
LIQUID MONITORING APPARATUS
Filed Sept. 22, 1965
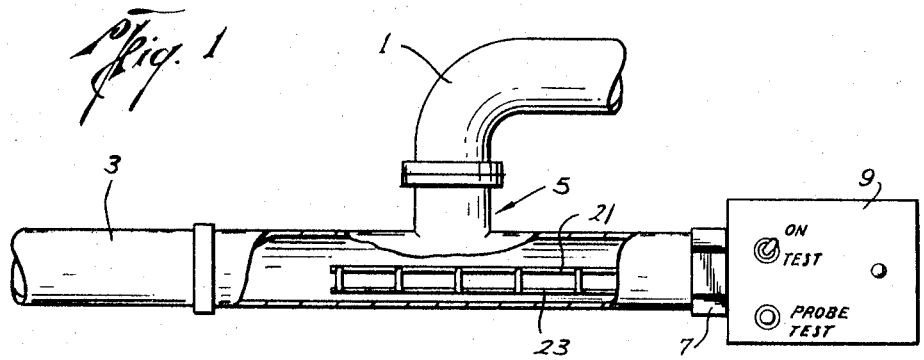
Fig. 1
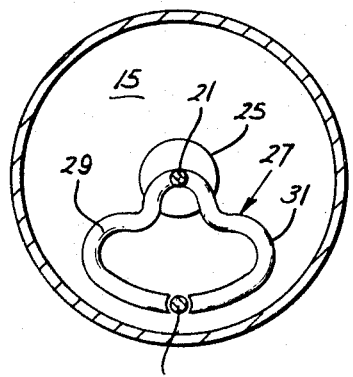
Fig. 2
Fig. 3
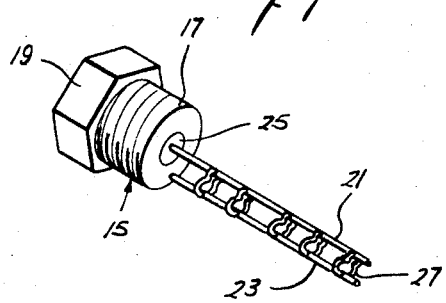
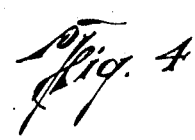
Fig. 4
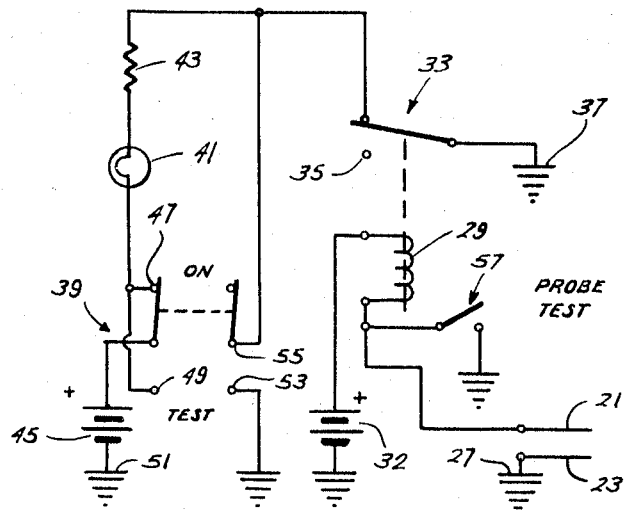
Hervey Van C. Street
Clarence S. Burch
INVENTORS
BY
Arnold and Roylance
ATTORNEYS Hervey Van C. Street
Clarence S. Burch
INVENTORS BY
Arnold and Roylance
ATTORNEYS 
United States Patent Office 3,445,834
Patented May 20, 1969

3,445,834
LIQUID MONITORING APPARATUS
Hervey Van C. Street, Drawer S., Humble, Tex. 77338, and Clarence S. Burch, 12118 Chimney Rock, Houston, Tex. 77035
Filed Sept. 22, 1965, Ser. No. 489,354
Int. Cl. G08b 21/00; H01h 29/00
U.S. Cl. 340—236                    12 Claims

ABSTRACT OF THE DISCLOSURE

In one exemplar embodiment, a device for detecting the existence of a flowing liquid in a pipe, the device having laterally spaced probes adapted for axial insertion into the pipe. One of the probes has arcuate contact members extending transversely to the probes and adjacent the bottom wall of the pipe, with the ends of the contact members spaced from the other probe. The contact members cause a turbulence in the flowing liquid for urging a sufficient quantity of liquid to bridge the probe spacing and energizing an electrical circuit.

---

This invention relates to liquid detection devices and more specifically to devices adaptable for insertion into a pipe capable of carrying liquid for monitoring the existence of liquid therein.

It is often imperative in pipe lines carrying liquid, as in the case with oil during its production or transmssion, to continually monitor for the presence or absence of such liquid within the line. The absence of liquid flowing in the pipe may indicate serious trouble in the nature of a line break, a cave in, etc. and if undetected may cause not only loss of valuable liquid and flooding of the area opposite any break, but also may cause serious damage to such equipment as pumping units operating "dry," i.e., under non-lubricated and hence high friction conditions.

Monitoring devices heretofore commonly employed have been of the pressure-sensitive type. When it has been necessary to distinguish liquid pressure from gas pressure, float devices have been used.

Although satisfactory in some applications, these devices have many drawbacks. They are frequently mechanically complex and therefore are expensive to manufacture and often difficult to maintain. Erroneous indications often result when the moving parts jam or become plugged with solids present in the liquid. Additionally, moving parts are subject to wear, requiring expensive down time to replace (even when malfunctions are discovered).

Electrical monitoring devices have been experimented with, but heretofore every known device has had serious shortcomings as a simple, easy-to-use and maintain electrical liquid monitoring probe.

Those that have been imbedded in the wall of the pipe have resulted in a weakened section of the pipe wall, been hard to replace and have clogged with residue adhering to the pipe wall.

Others having working parts such as leaf springs, movable contacts, etc., within the pipe have been subject to high wear and hence have required frequent replacement (particularly when the liquid flow being monitored is rapid or intermittent).

Highly complicated electrical indicating devices employing photocells have been successful, but again the cost and adjustment precision that is required for proper operation has discouraged wide-spread use of these devices.

Similarly, traps and complex electrolysis analyzers for detecting the change or rate of change of decomposition of the pipe fluid and hence the degree of contamination in the fluid are not generally economically satisfactory for merely monitoring for the presence or absence of liquid within a pipe.

Therefore, a general object of this invention is to provide an improved liquid monitor assembly of simple electrical construction utilizing the conductive property of most liquids to bridge probe contacts inserted in the liquid flow path.

Another object of this invention is to provide an improved electrical probing device for monitoring flowing liquid which also creates turbulence in the line to help the liquid bridge the probe contacts even when the liquid level is quite low.

Yet another object of this invention is to provide an improved electrical probing apparatus utilizing the conductive property of most flowing liquids for providing monitoring of such flow as well as actuating ancillary circuits when such flow ceases.

Still another object of this invention is to provide an improved liquid detecting probe for use in pipe lines of a character particularly well-suited to be sensitive to even low liquid flow and which will not interfere materially with flow in a line.

Yet another object of this invention is to provide an improved construction for a sensing probe for monitoring liquid flow in a pipe containing flammable liquid operating under such low-current conditions that there is negligible arcing hazard.

Still another object of this invention is to provide an improved electrical probe having no moving parts for insertion into a pipe for monitoring liquid flow in the pipe.

Yet another object of this invention is to provide an improved electrical probe assembly for insertion into a pipe for monitoring liquid flow in the pipe that is easily tested for operability without interrupting the flow of liquid in the pipe.

These and other objects of this invention will be readily apparent to one skilled in the art with reference to the disclosure of the invention related herein.

In accordance with one embodiment of the invention, the detecting probes are mounted in a bull plug for insertion into a pipe line at a T connector, one of the probes being conductively mounted to the bull plug and the other being insulated therefrom. The conductively mounted probe becomes grounded to the pipe line when the bull plug is secured in place.

The probes are mounted in the bull plug so that the insulated probe extends substantially from the center and the grounded probe extends from near an edge so as to be approximately ¼ inch from the lowest inside wall of the pipe when the bull plug is installed.

Secured along the insulated probe are a plurality of arcuate sections, nominally five in number, shaped to cover a significant area of the lower part of the pipe where low liquid levels normally flow, the ends of the sections terminating at a point about ⅛ inch from the grounded probe.

When liquid flows past the arrangement the arcuate sections disturb the flow slightly to cause a certain amount of turbulence, thereby ensuring the liquid bridges the ⅛-inch gap between the arcuate sections secured to the insulated probe and the grounded probe. Almost every liquid is sufficiently conductive for such purpose.

By connecting indicating components between the terminal end of the insulated probe in the bull plug and ground, detection of the existence of liquid flow is possible. Also, if it is desired to provide controlling circuits for actuating ancillary pumping units, etc., they may be similarly connected.

More particular description of the invention may be had by reference to the description below and the appended drawings, which form a part of this specification. It is to be noted, however, that the appended drawings illustrate only typical embodiments of the invention and therefore are not to be considered limiting of its scope for the invention will admit to other equally effective embodiments.

In the drawings:

FIG. 1 is a partial plan view, partially in cutaway section, showing one embodiment of this invention connected for use in a typical installation.

FIG. 2 is an end view of one embodiment of the invention.

FIG. 3 is a pictorial view of the embodiment shown in FIG. 2.

FIG. 4 is an electrical schematic diagram of one circuit that may be used in the invention.

Figure 5:
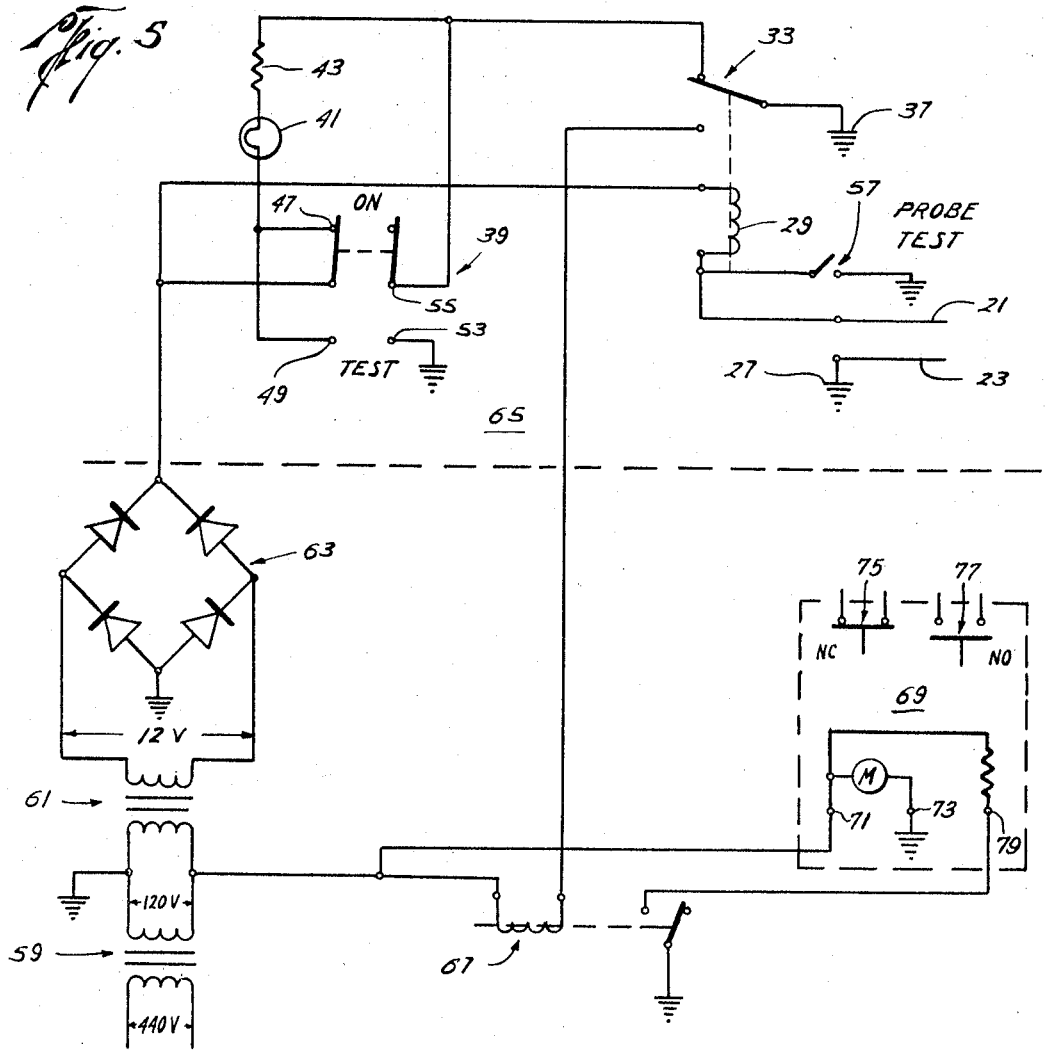
FIG. 5 is an electrical schematic diagram of another circuit that may be used in the invention.

Referring now to the drawings and first to FIG. 1, a pipe line fragment is shown in which a conductive liquid has been established. It may be assumed for purposes of discussion that the liquid is typical production oil being transmitted in the pipe, although the liquid may be any liquid capable of completing an electronic circuit in the presence of a small direct current potential on the order of a few volts. Almost any liquid other than distilled water fulfills this requirement.

Connected to the incoming pipe section 1 and the outgoing pipe section 3 may be a T connector 5. As illustrated section 1 is secured to the base of the T and section 3 is secured to one end of the cross of the T. This may be done conventionally by internally and externally mating connection ends of the pipe and T connector.

Similarly secured into the other end of the cross of the T is the probe assembly, generally designated at 7. This probe assembly comprises a matingly externally threaded connector end for screwing into T connector 5, an electronic package 9 (to be discussed below), and two elongated probes 21 and 23.

FIG. 2 shows a view of one embodiment of the probe assembly looking into the probe end, an oblique pictorial view of the same embodiment being shown in FIG. 3. The base connector end or bull plug 15 of the assembly is threaded over a part of its length with threads 17 for screwing into the T connector. The threads are typically tested against leaks in the presence of pressure of 600 p.s.i. A hexogonal section 19, slightly larger in diameter than the threaded portion, at one end of the bull plug may be provided to allow the bull plug to be tightened into the internally threaded end of the mating T connector.

Probes 21 and 23, which may be about ¼ inch in diameter, extend from the end of the bull plug opposite the hexagonal section. The probes may be substantially parallel to one another and extend substantially in a longitudinal direction with respect to the bull plug to which they are secured.

Probe 23 is embedded in the bull plug extending from a point near one edge, thereby becoming conductively integrally affixed therewith, at a distance of about ¼ inch from the outside edge. This dimension is not critical, but has proved to be satisfactory.

Probe 21, of approximately the same length as probe 23, extends from approximately the center of the bull plug. Probe 21 may be conductively insulated from the bull plug material by insulating epoxy 25, or other suitable material.

At spaced positions along probe 21 are a series of arcuate contact members 27, the structure of which is best shown in FIG. 2. The contact members may each comprise two arms 29 and 31, one extending to the left and the other to the right, and secured to probe 21 by any convenient method, such as by welding. The arms are shaped so as to follow the lower circumferential edge of the bull plug for some distance finally terminating in a free end spaced a small distance from probe 23. This spacing gap may nominally be on the order of ⅛ inch. The ends of the arms may be contoured slightly to be complementary to the side surface of the probe (illustrated as being circular in cross section) so that there is a uniform spacing over the width of the gaps, i.e., the distance between the surface of probe 23 and the free ends of the arms.

In operation, probe 23 projects into the pipe where the existence of liquid is to be monitored and is positioned in the lowest part of the pipe into which it is inserted. In FIG. 1, probe 23 is located next to the horizontal wall of the inverted T connector. The pipe surface next to the lowest probe does not have to be aligned horizontally, but to achieve the full benefits of the configuration of the probes the assembly in preferably placed in a non-vertical section of the pipe.

Positioning of the lower probe may be achieved by marking the position externally on the bull plug and tightening the bull plug until the lower probe is oriented in the desired location. Although tested for 600 p.s.i., it is unusual in the oil industry to encounter pressures in excess of 125 p.s.i. Therefore, even if the bull plug is a fraction of a turn from its tightest position, there still is no leakage at the connection.

It should be noted that a T connection has been used for illustrating a joint at which the probe assembly may be secured. It is readily apparent that other junctions suitably adapted for receiving the assembly may also be used.

When there is a relatively large quantity of liquid flowing in the pipe, probe 23 becomes completely surrounded with liquid, easily filling the gaps between the ends of arms 29 and 31 and the surface of probe 23. However, when the liquid flow is low, such surrounding would not normally be present, except for the configuration of arms 29 and 31. Even low level liquid coming in contact with these arms will be swirled in turbulent fashion causing liquid to bridge at least some of the contact gaps. Assuming that there are five arcuate members having a total of ten free ends, the likelihood of liquid being present and not bridging or closing at least one of the gaps is extremely remote.

It should be noted that five arcuate members having ten arms are assumed for purposes of illustration. This number has been found to be optimumly satisfactory for ensuring conductive bridging of the probes. Only one arcuate arm, of course, is all that is absolutely required for operability.

A simple electronic package switching means 9 utilized as an actuating circuit for connection to the probes is shown in FIG. 4. Probe 23 may be connected at ground 27 (normally accomplished in practice through the bull plug and the pipe in which it is secured). Insulated probe 21, on the other hand, may be connected to a relay coil 29, the other side of which may be connected to a battery 32 having a return path to ground. A battery voltage of 12 volts has been found quite satisfactory.

When there is bridging conductive liquid between probes 21 and 23, a small current which may on the order of only a few milliamperes (and hence resulting in no arcing at the probes within the pipe) will cause contacts 33 of coil 29 to be attracted to energized position 35, thereby disconnecting the ancillary indicating circuit. When there is no bridging liquid between probes 21 and 23, contacts 33 open to their de-energized position, providing a ground return 37 to the indicating circuit.

The indicating circuit may merely comprise a double-pole, double-throw switch 39, a lamp 41, a limiting resistor 43 and a battery 45. For convenience, the double-pole, double-throw switch will be referred to as having a first bank and a second bank, each bank having a movable contact and two fixed contacts. The two movable contacts move together when the switch is thrown.

One satisfactory connection arrangement connects the de-energized contact of relay contacts 33 in series with resistor 43, lamp 41, both fixed contacts 47 and 49 of a first bank of double-pole, double-throw switch 39, battery 45 and ground 51. Through switch 39, lamp 41 is connected to battery 45 so that when relay contacts 33 are in the de-energized position a ground return is provided to light the lamp.

Connected in this manner lamp 41 indicates the existence of liquid by lighting when there is an absence of liquid in the pipe. The existence of liquid could just as easily be shown by wiring the lamp to indicate the existence of liquid by lighting when liquid is present.

For testing lamp 41, one fixed contact 53 of the second bank of switch 39 may be connected to ground and movable contact 55 of the same bank may be attached to the non-battery side of the resistor 43-lamp 41 combination. When switch 39 is placed in the ON position of the switch, the connection to contact 55 has no effect, but when the switch is placed in the TEST position so that movable contact 55 closes with contact 53 a ground return is provided and the lamp lights.

It should be noted that a single-pole, double-throw switch would also work, the battery being connected directly in series with the lamp without going through switch contacts, but such a connection does not permit the easy disconnect of the battery provided with the circuit shown.

Similarly, two batteries 32 and 45 are shown, although a circuit employing only one battery is operable. For example, battery 32 may be eliminated and the battery side of coil 29 connected directly to the positive side of battery 45.

If desired, it should be noted that a Probe Test switch 57 may also be provided. This switch may be merely a push button switch connected between the probe side of relay coil 29 and ground such that when the switch is closed bridging of the probes would be simulated.

A circuit adapted for alternating current application is shown in FIG. 5. Wherein the circuit shown in FIG. 4 and the circuit shown in FIG. 5 are similar, the same designating numbers are used.

A source voltage of 440 volts is assumed, which may be applied to transformer 59 to accomplish a voltage reduction to 120 volts. A further voltage reduction to 12 volts may be accomplished in transformer 61, the secondary side of which may be connected to a full wave bridge rectifier 63 for converting to direct current. One satisfactory bridge rectifier that has been used is Motorola model MDA 962-2. The direct current applied to indicating circuit 65 allows the circuit to operate similarly to that described in FIG. 4.

In addition, it may be desired to provide a controlling circuit for external ancillary equipment, such as a pumping unit. This may be done by connecting one coil side of a 120-volt relay 67 to the 120-volt side of transformer 59, the other side of which may be connected to the energized contact of relay contacts 33.

The 120-volt side of transformer 59 may be connected to a first motor-timer terminal 71 of a time delay unit 69, such as Cutler-Hammer model 46A300. This time delay unit typically has three motor-timer terminals (the second of which 73 is grounded) and a normally-closed set of contacts 75 and a normally-open set of contacts 77. The third motor-timer terminal 79 may be connected to the energized contacts of relay 67, thereby providing ground to the terminal when the coil of relay 67 is energized.

In operation, the controlling circuit operates external ancillary equipment in accordance with the operation of relay 67 and time delay unit 69. When coil 29 is energized (as a result of liquid being present between the probes), a ground is provided to coil 67, thereby energizing coil 67 and providing ground to two of the time-motor terminals.

When coil 29 becomes de-energized, contacts 33 open deenergizing coil 67 and removing ground from one of the timer-motor terminals, setting the timer in motion. After a time set by circuit 69 the normally-closed and normally-open contacts switch. By connecting the contacts appropriately in series with a holding coil in the starter circuit of a pumping unit, such a unit may be effectively controlled.

Although depending on the time delay unit used, with the model number of the time delay unit identified above, any time up to 300 minutes may be selected.

It also should be noted that indicating circuit 65 may be conveniently packaged separately from the power converting circuit and control circuit. This allows the indicating circuit to be physically attached directly to the probe at the T connector and the rest of the circuit at a more distant, and possibly more convenient, location, if desired.

Although the invention has been discussed in terms of simplified embodiments, it should be obvious to one skilled in the art that certain refinements can be made without deviating from the scope of the teachings hereof. For example, a neon flashing bulb may be used as the indicator for attracting attention. The light and controlling units may both operate without a time delay circuit or they may both operate only after a time delay.

Similarly, it should be noted that in the typical liquid production well, when liquid is no longer present gas pressure often remains. This gas pressure cleans the gap between the arms of the arcuate contact members and the probe of any residual droplets that may otherwise be left, thereby ensuring that there is no erroneous indication of the existence of liquid.

It should also be noted that the specific probe configuration illustrated in FIG. 2 may be varied from extensively. For instance, the insulated probe and the grounded probe may be interchanged in the bull plug so that the arcuate member contacts are connected to the grounded probe in the center with the free ends terminating very close to the insulated probe (located near the circumferential edge of the bull plug).

Figure 6:
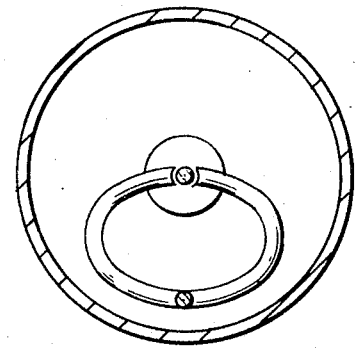
FIG. 6 is an end view of another embodiment of the invention.

In many applications it is not even necessary to have the gaps between the arms of the arcuate members and the probe to which it is not attached be in the lower part of the pipe. As shown in FIG. 6, the bridging gaps may be located in the center with the arcuate members being attached to the probe extending from the edge of the bull plug. Normally, liquid flowing in the pipe will be swirled up sufficiently by the arms so that the gaps are bridged.

It should be further noted that even though the construction of the probe assembly within the pipe is such that the flow of liquid is slightly disturbed to cause the turbulence mentioned above, it is not so great as to materially cause a block to occur. Also, the contacts, not being in the wall of the pipe, are free to be cleaned with residual gas pressure present in the absence of liquid.

Further, in the alternating current embodiment, a 440-volt source is assumed. Transformers and other components operating with other available source voltages can readily be substituted.

What is claimed is:

1. A liquid detecting assembly for monitoring the existence of a flowing conductive liquid in a pipe line, comprising in combination
   a base connector adapted to be secured to the pipe line,
   a first elongated probe conductively affixed to said base connector for projecting axially into the pipe line,
   a second elongated probe affixed to said base connector and insulated therefrom for projecting axially into the pipe line, and
   at least one arcuate contact member disposed transversely to said first and second elongated probes having one end conductively fixed to said second probe and the other end disposed adjacent said first probe, the arcuate contact member extending over an area adjacent the bottom wall of the pipe for contacting the flowing conductive liquid in the pipe line and urging said liquid into conductive bridging contact between said first probe and said other end of said contact member.

2. A liquid detecting assembly for monitoring the existence of liquid flowing in a non-vertical pipe, comprising in combination a conductive base connector having a threaded end for securing said connector to the pipe line, a first elongated probe conductively affixed to said base connector for projecting axially into the pipe line, said first probe projecting from a point near the circumferential edge of said base connector, said base connector being oriented so that said first probe is located adjacent the bottom wall of the pipe when said base connector is secured to said pipe, a second elongated probe affixed to said base connector and insulated therefrom for projecting axially into the pipe line, and at least one arcuate contact member conductively secured to said second probe and shaped to extend over an area adjacent the bottom wall of the pipe so as to cause turbulence in the liquid flowing in the pipe, the free end of said contact member being separated from said first probe so that the turbulent flowing conductive liquid in the pipe line conductively bridges said first probe and said second probe.

3. A liquid detecting assembly for monitoring the existence of liquid flowing in a non-vertical pipe line, comprising in combination a conductive base connector having a threaded end for securing said connector to the pipe line, a first elongated probe conductively affixed to said base connector for projecting axially into the pipe line, a second elongated probe affixed to said base connector and insulated therefrom for projecting axially into the pipe line, one of said probes projecting from a point near the circumferential edge of said base connector, said base connector being oriented so that said probe projecting from a point near the edge of said base connector is located adjacent the bottom wall of the pipe when said base connector is secured to said pipe line, and at least one accurate contact member conductively secured to one of said probes and shaped to extend over an area adjacent the bottom wall of the pipe so as to cause turbulence in the liquid flowing in the pipe line, the free end of said contact member being separated from the other of said probes so that the turbulent flowing conductive liquid in the pipe line is urged into a conductive bridging relation between said first probe and said second probe.

4. A liquid detecting assembly as described in claim 1, including electrical switching means connected to said first and second probes for indicating the existence of liquid in the pipe line.

5. A liquid detecting assembly as described in claim 1, including electrical switching means connected to said first and second probes for actuating ancillary apparatus.

6. A liquid detecting assembly as described in claim 3, including an electrical circuit comprising a relay having a coil and at least one switching contact, one side of said coil connected to one of said probes, an indicating circuit connected to said at least one contact of said relay, and a current source connected to said indicating circuit and to the other side of said coil, the return path from said current source being connected to the other probe for energizing said relay and actuating said indicator circuit when sufficient conductive liquid bridges said probes.

7. A liquid detecting assembly as described in claim 3, including an electrical circuit comprising a relay having a coil and a plurality of switching contacts, one side of said coil connected to one of said probes, a control circuit connected to one of said contacts of said relay for energizing ancillary circuits upon actuation of said relay, and a current source connected to said control circuit and to the other side of said coil, the return path from said current source being connected to the other probe for energizing said relay and actuating said control circuit with sufficient conductive liquid bridges said probes.

8. A liquid detecting assembly as described in claim 3, including an electrical circuit comprising a relay having a coil and a plurality of switching contacts, one side of said coil connected to one of said probes, an indicating circuit connected to one of said relay contacts, a control circuit connected to another one of said relay contacts for actuating ancillary circuits when said relay is energized, and current means connected to said indicating circuit, said control ciruuit, and to the other side of said coil, the return path from said current means being connected to the other probe for energizing said relay and actuating said indicating and control circuits when sufficient conductive liquid bridges said probes.

9. A liquid detecting assembly for monitoring the existence of a flowing conductive liquid in a non-vertical pipe, comprising in combination a conductive base connector having a threaded end for securing said connector in a coaxial relation to the pipe, a pair of elongated laterally spaced probes affixed to said base connector for projecting axially into the pipe, one of said probes being conductively affixed to said connector and projecting from a point adjacent to the lowermost circumferential edge of said connector for spacing said one probe longitudinally adjacent the bottom wall of the pipe, the other of said probes being affixed to said connector and insulated therefrom, and at least one arcuate contact member conductively secured to said other of said probes and extending transversely to said probe and adjacent the lower walls of the pipe with the free end of said member being spaced apart from said one probe, said contact member being adapted to cause turbulence in the flowing liquid for urging the liquid into a conductive bridging relation between said probes.

10. A liquid detecting assembly as described in claim 9, including an electrical circuit comprising a relay having a coil and at least one switching contact, one side of said coil connected to said other of said probes, an indicating circuit connected to said at least one contact of said relay, and a current source connected to said indicating circuit and to the other side of said coil, the return path from said current source being connected to said one probe for energizing said relay and actuating said indicator circuit when sufficient conductive liquid bridges said probes.

11. A liquid detecting assembly as described in claim 9, including an electrical circuit comprising
a relay having a coil and a plurality of switching contacts, one side of said coil connected to said other of said probes,
a control circuit connected to one of said contacts of said relay, for energizing ancillary circuits upon actuation of said relay, and
a current source connected to said control circuit and to the other side of said coil,
the return path from said current source being connected to said one probe for energizing said relay and actuating said control circuit when sufficient conductive liquid bridges said probes.

12. A liquid detecting assembly as described in claim 9, including an electrical circuit comprising
a relay having a coil and a plurality of switching contacts, one side of said coil connected to said other of said probes,
an indicating circuit connected to one of said relay contacts,
a control circuit connected to another one of said relay contacts for actuating ancillary circuits when said relay is energized, and
current means connected to said indicating circuit, said control circuit, and to the other side of said coil,
the return path from said current means being connected to said one probe for energizing said relay and actuating said indicating and control circuits when sufficient conductive liquid bridges said probes.

References Cited

UNITED STATES PATENTS

| 336,078 | 2/1886 | Ball | 340—242 |
| 2,067,440 | 1/1937 | Finney | 340—242 |

FOREIGN PATENTS

| 61,850 | 1/1944 | Denmark. |
| 849,770 | 9/1952 | Germany. |

JOHN W. CALDWELL, *Primary Examiner.*

DANIEL K. MYER, *Assistant Examiner.*

U.S. Cl. X.R.

200—61.5